(12) United States Patent  
Lincoln, III et al.

(10) Patent No.: US 7,045,706 B1  
(45) Date of Patent: May 16, 2006

(54) FLUSH FLOOR SERVICE HIDEAWAY UNIVERSAL BOX ASSEMBLY

(75) Inventors: Clifford F. Lincoln, III, Atlanta, GA (US); Larry H. Smith, Clemmons, NC (US); George E. Sharp, III, Kernersville, NC (US)

(73) Assignee: Tyco Electronics Corporation, Middletown, PA (US)

( * ) Notice: Subject to any disclaimer, the term of this patent is extended or adjusted under 35 U.S.C. 154(b) by 38 days.

(21) Appl. No.: 11/063,685

(22) Filed: Feb. 23, 2005

(51) Int. Cl.  
*H02G 3/08* (2006.01)

(52) U.S. Cl. .............................. 174/48; 174/50; 174/53; 220/3.2; 220/3.3

(58) Field of Classification Search ................ 174/48, 174/50, 53, 57, 58, 49; 220/3.2, 3.3, 3.4, 220/3.5, 3.6, 3.7, 3.8, 4.02; 248/906; 439/535, 439/536; 52/220.1, 220.3, 220.5, 220.7  
See application file for complete search history.

(56) References Cited

U.S. PATENT DOCUMENTS

| | | | |
|---|---|---|---|
| 3,932,696 A | 1/1976 | Fork et al. | |
| 3,943,272 A | 3/1976 | Carroll et al. | |
| 4,289,370 A * | 9/1981 | Storck ......................... | 174/48 |
| 4,443,654 A | 4/1984 | Flachbarth et al. | |
| 4,536,612 A | 8/1985 | Domigan | |
| 4,602,840 A * | 7/1986 | Romatzick ................. | 439/535 |
| 4,627,684 A * | 12/1986 | D'Amato ..................... | 174/66 |
| 4,721,476 A * | 1/1988 | Zeliff et al. ................. | 174/48 |
| 4,864,078 A * | 9/1989 | Bowman ..................... | 174/48 |
| 4,927,384 A * | 5/1990 | Bates ......................... | 439/535 |
| 4,967,041 A | 10/1990 | Bowman | |
| 5,008,491 A * | 4/1991 | Bowman ..................... | 174/48 |
| 5,122,069 A * | 6/1992 | Brownlie et al. ............. | 174/53 |
| 5,243,129 A * | 9/1993 | Bates et al. .................. | 174/48 |
| 5,257,487 A | 11/1993 | Bantz et al. | |
| 5,285,009 A | 2/1994 | Bowman et al. | |
| 5,468,908 A | 11/1995 | Arthur et al. | |
| 5,575,668 A * | 11/1996 | Timmerman ................. | 174/48 |
| 5,796,037 A * | 8/1998 | Young et al. ................ | 174/50 |
| 5,896,478 A | 4/1999 | Dauber et al. | |
| 6,265,662 B1 | 7/2001 | Riedy et al. | |
| 6,274,809 B1 * | 8/2001 | Pudims et al. ................ | 174/48 |
| 6,450,353 B1 | 9/2002 | Riedy et al. | |
| 6,663,435 B1 | 12/2003 | Lincoln, III et al. | |

* cited by examiner

*Primary Examiner*—Angel R. Estrada

(57) ABSTRACT

A universal floor box assembly is provided including a universal box having a bottom wall, and front, rear right side and left side walls extending upwardly from the bottom wall. The front, rear, right side and left side walls each define a respective upper terminal edge. At least one of the front, rear, right side and left side walls define an aperture formed therein. Desirably, an electrical, a telephonic and/or a data cable is/are receivable within the universal box. The universal box assembly further includes an electrical, telephonic and/or data interface selectively front loaded in the aperture of the backing member. The at least one electrical, telephonic and data interface are selectively connectable to a transition block assembly of the power cable.

19 Claims, 7 Drawing Sheets

FLUSH FLOOR SERVICE HIDEAWAY UNIVERSAL BOX ASSEMBLY

BACKGROUND

1. Technical Field

The present disclosure is directed to access flooring modules in which electrical power and signal cables are accessible to a user and, more particularly, to universal floor box assemblies which are flush to the floor and which facilitate installation, access, repair and service thereof.

2. Background of Related Art

In-floor service distribution systems for concrete slab floors are assembled on a deck sheet of floor form and cast into the floor slab. The service distribution system must be concrete tight (i.e., fluid tight) to prevent partial or complete filling of parts of the system by concrete seeping into the distribution system before setting of the slab. Thereafter, the surrounding concrete supports and reinforces the distribution system.

Floor boxes, for in-floor activations, are typically positioned in a concrete floor slab closely below the upper floor surface and are constructed to accept an activation kit. Activation kits conventionally have a frame that is secured to the floor box in a manner that allows adjustment of the frame in the direction generally perpendicular to the floor surface. That adjustment allows the frame to be positioned flush with the floor surface. Concrete floor slabs may be of various depths or thicknesses and floor boxes of various depths are desirable to provide capacity to accept more or larger service conductors or components.

In-floor floor boxes for activation kits are typically constructed to be conventionally connected to conduit and are adapted to accept activation kits. Ideally, floor boxes for in-floor distribution systems must be strong enough to maintain connection to conduit and prevent concrete from seeping into the floor box during pouring and setting of the concrete floor slab. After the concrete has set, the floor box must only support the activation kit.

Once the in-floor floor boxes are cemented into the floor, wiring to and from the floor box and various wiring methodologies are limited. Typically, modules in a conventional in-floor floor box can not be load balanced except by relocating wires at the circuit protection power source.

Accordingly, a need exists for an in-floor floor box or universal box which enables load balancing for power, which enables "front loading" of activation devices (e.g., power devices, data devices, communication devices, etc.) and/or which enables a wide range of wiring methodologies (e.g., undercarpet, manufactured wiring, hard wiring, etc.).

SUMMARY

The present disclosure relates to a universal floor box assembly, for receiving an undercarpet power cable or routing of in-floor and/or sub-floor installation, wherein the power cable or routing includes a transition block assembly.

In accordance with an aspect of the present disclosure, the universal floor box assembly includes a universal box having a bottom wall, front and rear walls extending upwardly from the bottom wall, and right side and left side walls extending upwardly from the bottom wall. The front, rear, right side and left side walls each define a respective upper terminal edge. At least one of the front, rear, right side and left side walls define an aperture formed therein. Desirably, an electrical, a telephonic and/or a data cable is/are receivable within the universal box.

The universal box assembly further includes a power and activation plate assembly selectively connectable to the universal box. The plate assembly includes a backing member defining at least one aperture therein. The universal box assembly further includes an electrical, telephonic and/or data interface selectively front loaded in the aperture of the backing member. The at least one electrical, telephonic and data interface are selectively connectable to a transition block assembly of the power cable.

In an embodiment, the universal floor box assembly further includes a trim and lid assembly selectively connectable with the universal box. The trim and lid assembly may include a shroud having a perimetral flange and a perimetral rim extending substantially orthogonally from the perimetral flange. The shroud may be configured and dimensioned to rest atop flanges extending orthogonally outward from the front, rear, left side, and right side walls of the universal box.

In another embodiment, the universal floor box assembly may further include a hatch assembly selectively operatively connectable with the universal box. Desirably, the hatch assembly is selectively connectable to the perimetral flange of the shroud. The hatch assembly may include a bezel configured and adapted to overlie and snap-fit engage the perimetral flange. The bezel defines a window.

The cover assembly may further include a cover pivotably connected to the bezel. The cover is desirably pivotable between a first position in which the window of the bezel is open and a second position in which the window of the bezel is closed. Desirably, the cover defines a finger-hold to facilitate moving of the cover between the first and second positions in order to open and close the universal box.

In an embodiment, the universal floor box assembly further includes a cover plate sized to rest atop the upper terminal edges of the front, rear, left side and right side walls of the universal box. The cover plate may be selectively securable to the upper terminal edges of the universal box. The universal floor box assembly may further include a gasket disposed between the cover plate and the upper terminal edges of the universal box when the cover plate is secured to the universal box. It is envisioned that the gasket includes at least one tab extending from a surface thereof for occluding a respective cut-out formed in a respective front, rear, left side and right side wall of the universal box.

It is envisioned that at least one cut-out may be formed in the front, rear, left side and/or right side walls of the universal box. The cut-out extends through an upper terminal edge of the respective front, rear, left and right side walls.

The universal floor box assembly may further include flanges extending substantially orthogonally and outwardly from the upper terminal edges of the front, rear, left side and right side walls of the universal box.

In an embodiment, it is envisioned that the universal floor box assembly may further include knock-out plates configured and dimensioned to cover each aperture formed in each of the front, rear, left side and right side walls of the universal box.

Desirably, the universal box includes leveling brackets extending therefrom.

In accordance with another aspect of the present disclosure, a method of load balancing electrical, telephonic and data conduits at an interface point, is provided. The method includes the steps of providing a universal box assembly. The universal box assembly may include a universal box configured to receive electrical, telephonic and data conduits therein; a power and activation plate assembly selectively connectable to the universal box, the plate assembly including a backing member defining at least one aperture therein; and at least one of an electrical, telephonic and data interface selectively front loaded in the aperture of the backing member, wherein the at least one electrical, telephonic and data interface are selectively connectable to a transition block assembly of the power cable.

The method further includes the steps of disassociating at least one of the electrical, telephonic and data interfaces from the backing member; and balancing at least one of the power and electrical loads at the site of the universal box.

DETAILED DESCRIPTION OF PREFERRED EMBODIMENTS

Figure 1:
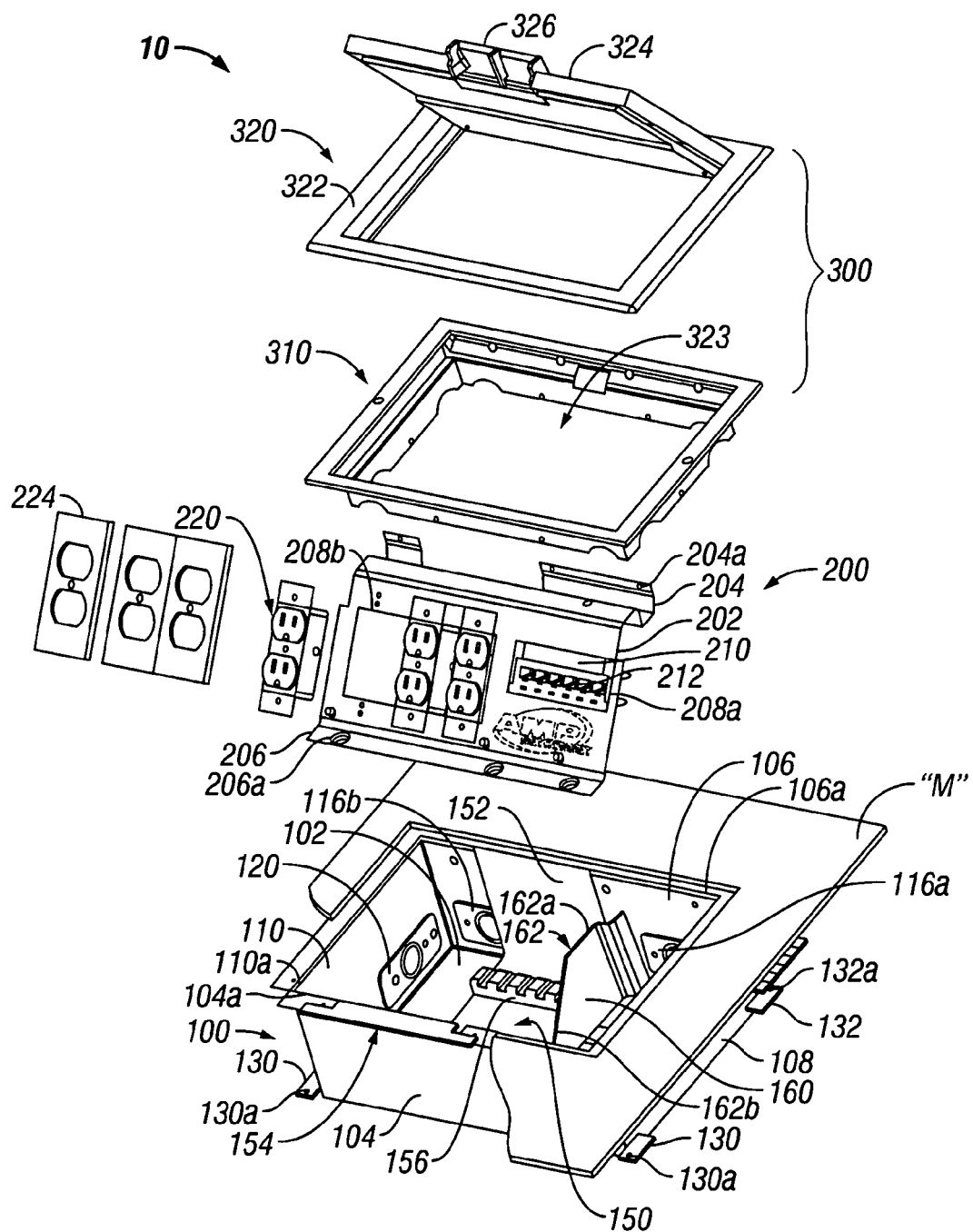
FIG. 1 is a perspective view, with parts separated, of a universal box assembly according to an embodiment of the present disclosure, including undercarpet routing, a power and activation plate, and a trim and lid assembly.

Embodiments of the presently disclosed universal box will now be described in detail with reference to the drawing figures wherein like reference numerals identify similar or identical elements. As used herein, spatially orienting terms, such as "left", "right", "upward", and "downward" are used for convenience of description of the preferred embodiments by reference to the drawing. Unless so specified, these terms do not necessarily describe the absolute location in space, such as left, right, upward, downward, etc., that any part must assume.

Referring initially to FIG. 1, in accordance with an embodiment of the present disclosure, a universal floor box assembly, for in-floor and sub-floor installations, is generally designated as 10. Universal box assembly 10 includes a universal box 100, a power and activation plate assembly 200 selectively connectable with universal box 100, a trim and lid assembly 300 selectively connectable with universal box 100, and optionally, a cover assembly 400 (see FIG. 2) selectively connectable with universal box 100.

With reference to FIGS. 1–4, 6 and 7, universal box 100 includes a substantially rectangular bottom wall 102 defining four sides from which a front wall 104, a rear wall 106, a right side wall 108, and a left side wall 110 extend, generally perpendicularly, to an upper terminal edge 104a, 106a, 108a and 110a, respectively. Front wall 104, rear wall 106 and side walls 108, 110 form a continuous perimetral wall of universal box 100. Desirably, each of front wall 104, rear wall 106, and side walls 108, 110 includes a flange 104b, 106b, 108b and 110b extending orthogonally outward from a respective upper terminal edge 104a, 106a, 108a and 110a thereof.

Figure 2:
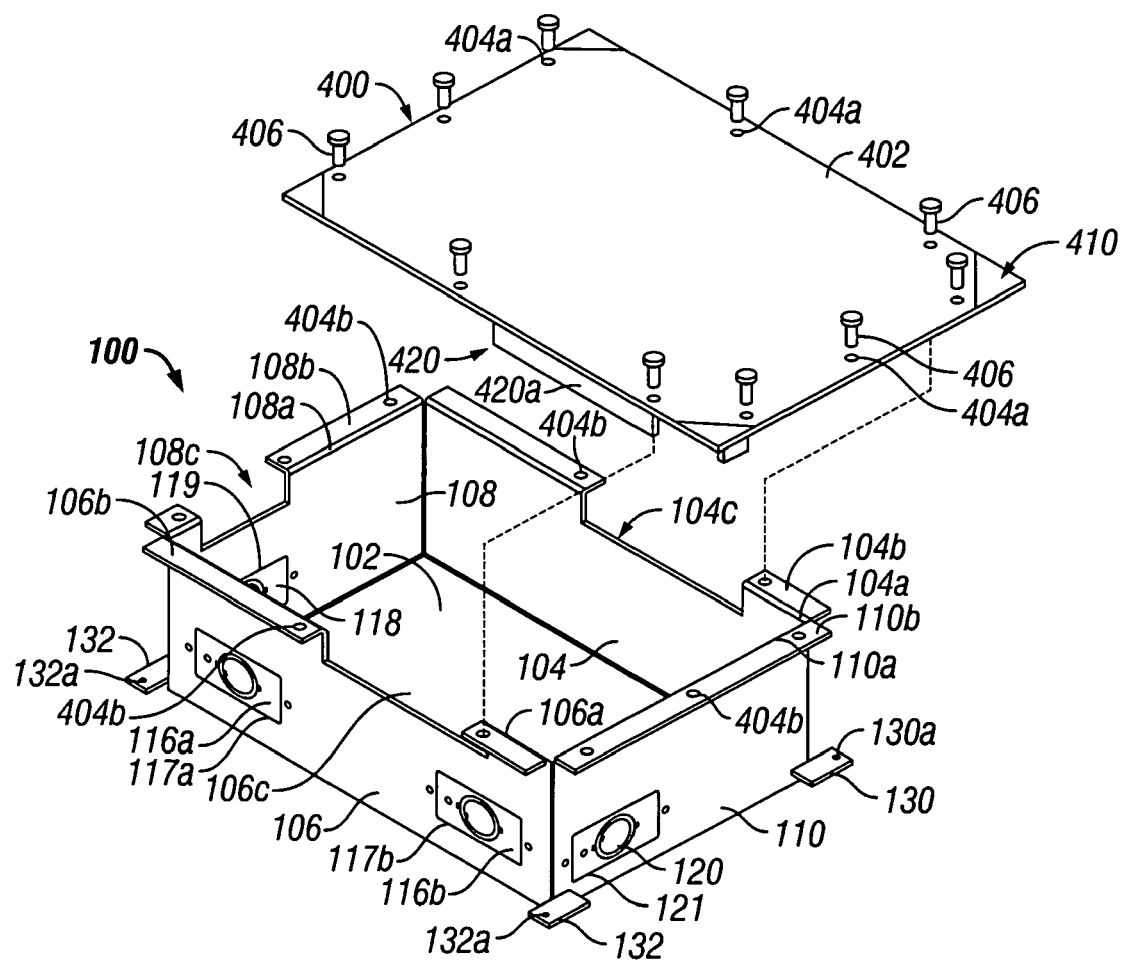
FIG. 2 is perspective view of the universal box of the assembly of FIG. 1, shown with the disposable cover and gasket separated therefrom.
Figure 3:
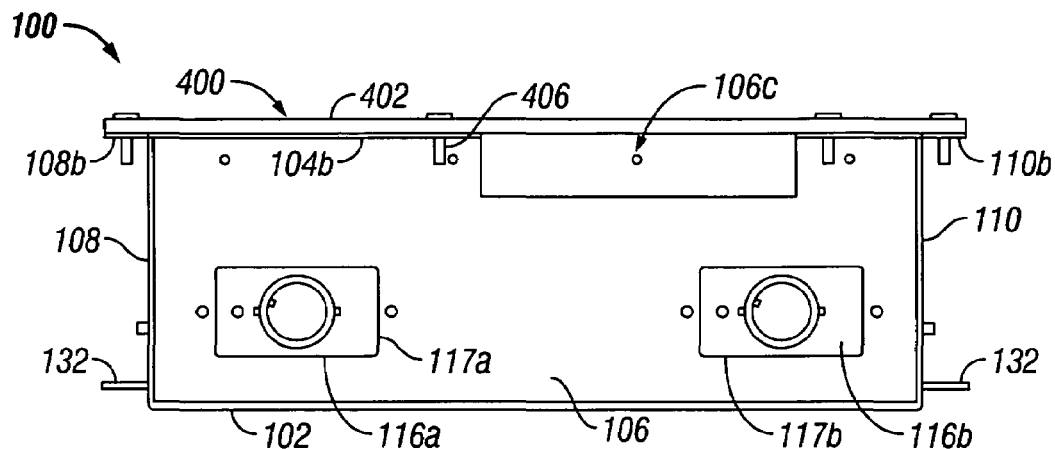
FIG. 3 is a front elevational view of the universal box of FIG. 2.
Figure 4:
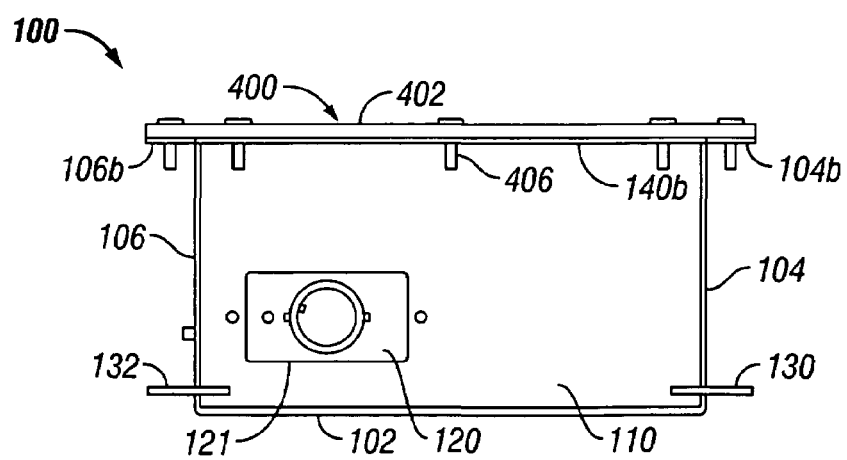
FIG. 4 is a right side elevational view of the universal box of FIGS. 2 and 3.
Figure 5:
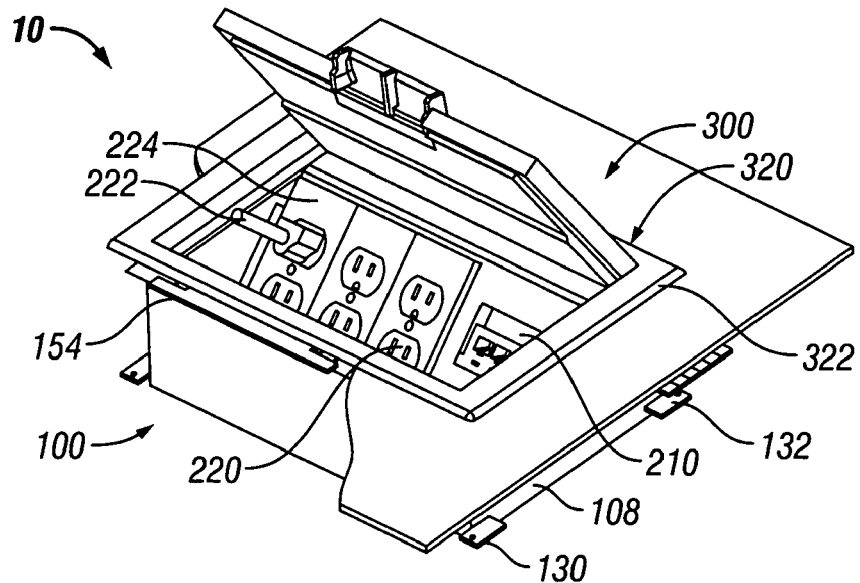
FIG. 5 is a perspective view, with parts assembled, of the universal box assembly of FIG. 1.
Figure 6:
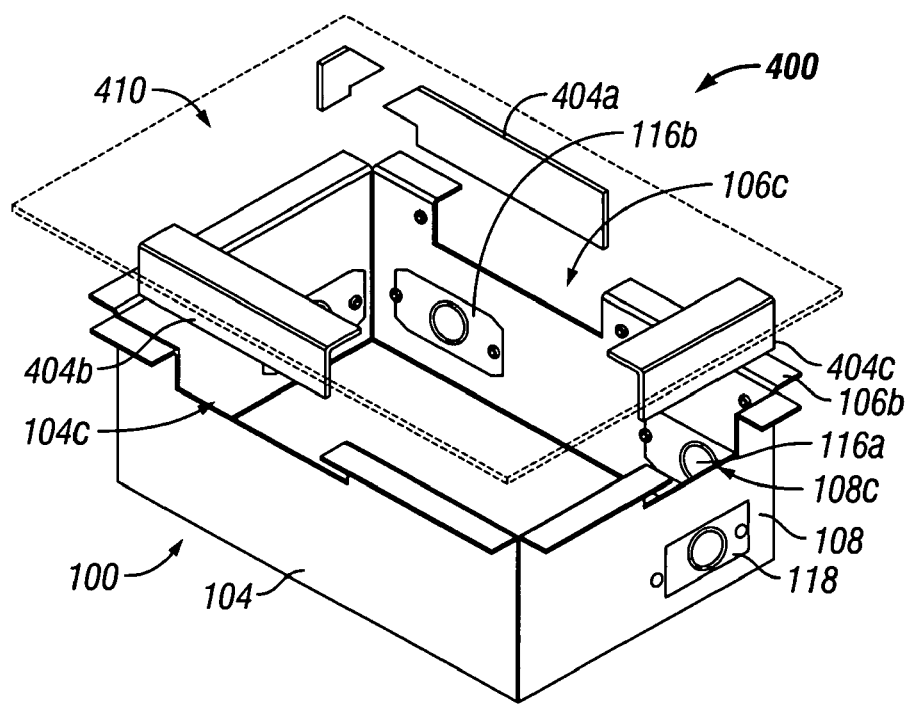
FIG. 6 is a perspective view of the universal box of FIGS. 2–4 including an abandonment plate, shown in phantom, separated therefrom.
Figure 7:
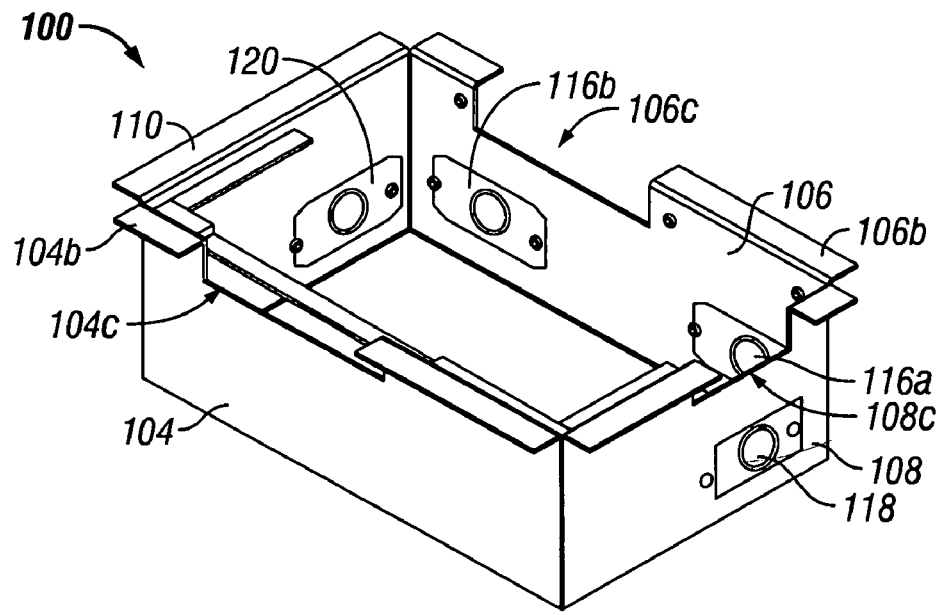
FIG. 7 is a perspective view of the universal box of FIGS. 1–6.

Desirably, as seen in FIGS. 2, 6 and 7, right side wall 108 includes a cut-out 108c extending toward bottom wall 102 from upper edge 108a. Additionally, each of front wall 104 and rear wall 106 desirably includes a respective cut-out 104c, 106c extending toward bottom wall 102 from upper edge 104a, and 106a, respectively.

As seen in FIGS. 1–4, 6 and 7, rear wall 106 of universal box 100 includes at least one knockout plate, here two knockout plates 116a, 116b being shown, removably connected to rear wall 106 and covering respective apertures 117a, 117b formed in rear wall 106. Right side wall 108 includes at least one knockout plate 118 removably connected to right side wall 108 and covering a respective aperture 119 formed in right side wall 108. Left side wall 110 includes at least one knockout plate 120 removably connected to left side wall 110 and covering a respective aperture 121 formed in left side wall 110. In use, knock-out plates 116a, 116b, 118 and 120 may be removed, as necessary, to permit passage of electrical and/or data transmission conduits into and/or out of universal box 100.

Universal box 100 includes a pair of leveling brackets 130, 132 extending substantially orthogonally from each side wall 108, 110. Each leveling bracket 130, 132 includes a threaded height adjustment hole 130a, 132a, respectively, formed therein, the function of which will be described in greater detail below.

Desirably, universal box 100 is fabricated from galvanized sheet metal or the like.

With reference to FIGS. 2–4 and 6, as mentioned above, universal box assembly 100 may include a cover assembly 400 or the like. Cover assembly 400 includes a cover plate or abandonment plate 402 sized to rest atop flanges 104b, 106b, 108b and 110b of respective walls 104, 106, 108 and 110. Desirably, cover plate 402 includes a plurality of holes 404a formed around a periphery thereof. It is envisioned that holes 404a of cover plate 402 align with and/or are in registration with corresponding holes 404b formed in flanges 104b, 106b, 108b and 110b of respective walls 104, 106, 108 and 110. A plurality of securing means, such as, for example, screws 406 may be used to secure cover plate 402 to flanges 104b, 106b, 108b and 110b of universal box 100. It is envisioned that cover plate 402 is fabricated from a substantially rigid, durable material, such as, for example, galvanized sheet steel and the like.

As seen in FIGS. 2 and 6, a gasket 410 or the like may be provided. Gasket 410 is desirably sized to at least overlay flanges 104b, 106b, 108b and 110b of universal box 100. In this manner, in use, gasket 410 is disposed between flanges 104b, 106b, 108b and 110b of universal box 100 and cover plate 402. Gasket 410 desirably functions to seal the periphery of universal box 100 against the introduction of or escape of foreign substances into and/or out of universal box 100 from between cover plate 402 and flanges 104b, 106b, 108b and 110b of universal box 100. Desirably, gasket 410 is fabricated from a substantially flexible, resilient, compressible material, such as, for example, rubber, polyethylene, polyurethane, etc.

As seen in FIGS. 2 and 6, cover 400 and gasket 410 includes a plurality of wall members or tabs 420 extending orthogonally from a surface thereof. Desirably, tabs 420 are spaced a distance in from an outer terminal edge of gasket 410. Tabs 420 are positioned at locations on gasket 410 such that tabs 420 desirably completely cover and/or occlude cut-outs 104c, 106c and 108c of walls 104, 106 and 108, respectively. For example, a first tab 420a may be secured to or extend from gasket 410 and may be dimensioned to completely occlude cut-out 106c of rear wall 106 when gasket 410 is placed atop flanges 104b, 106b, 108b and 110b of universal box 100. A second tab 420b may be secured to or extend from cover 400 and gasket 410 and may be dimensioned to completely occlude cut-out 104c of front wall 104 when gasket 410 is placed atop flanges 104b, 106b, 108b and 110b of universal box 100. A third tab may be secured to or extend from cover 400 and gasket 410 and may be dimensioned to completely occlude cut-out 108c of right side wall 108 when gasket 410 is placed atop flanges 104b, 106b, 108b and 110b of universal box 100.

Figure 8:
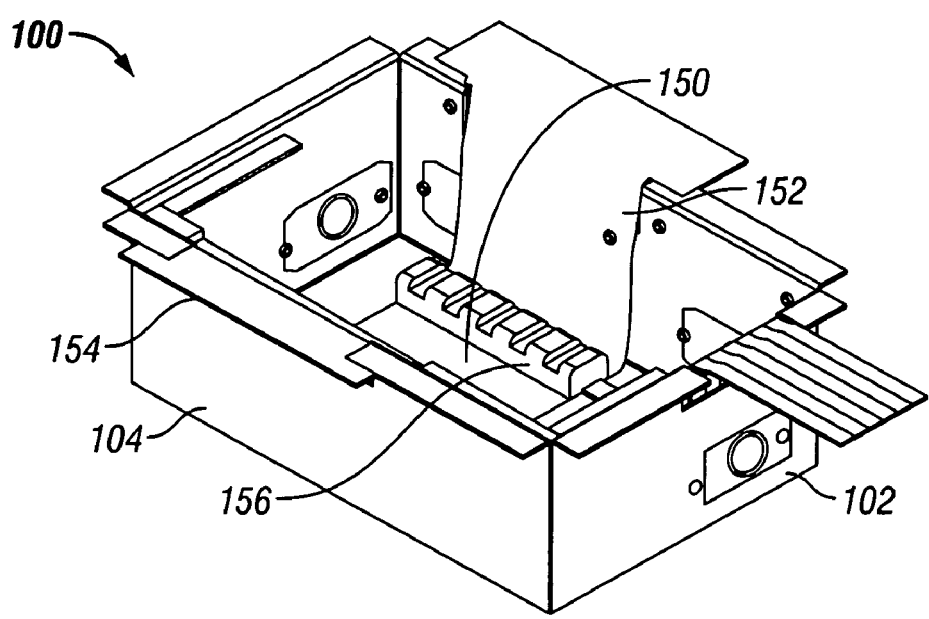
FIG. 8 is a perspective view of the universal box of FIGS. 1–7, including an undercarpet routing operatively associated therewith.
Figure 9:
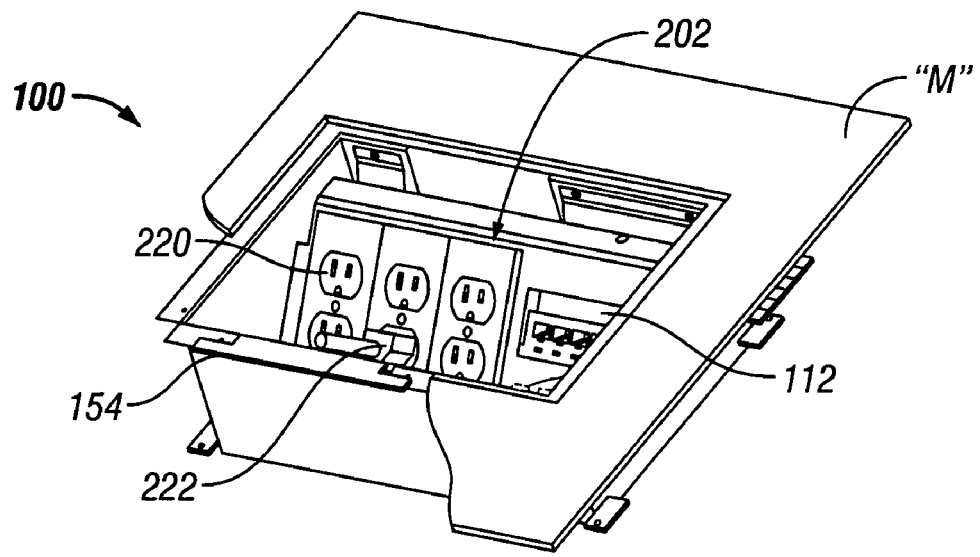
FIG. 9 is a perspective view of the universal box of FIGS. 1–8, including a power and activation plate operatively associated therewith, wherein the universal box is shown installed beneath a floor.
Figure 10:
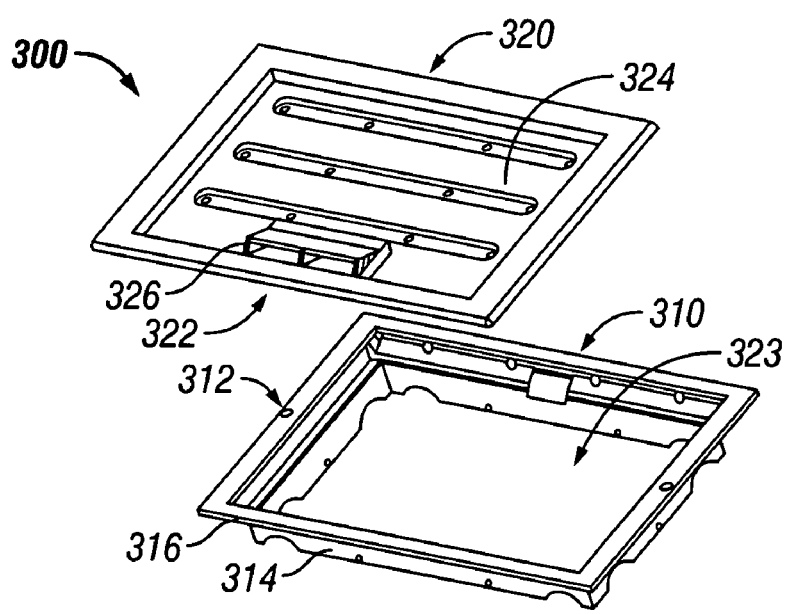
FIG. 10 is a perspective view of a trim and lid assembly, with parts separated, according to an embodiment of the present disclosure.
Figure 11:
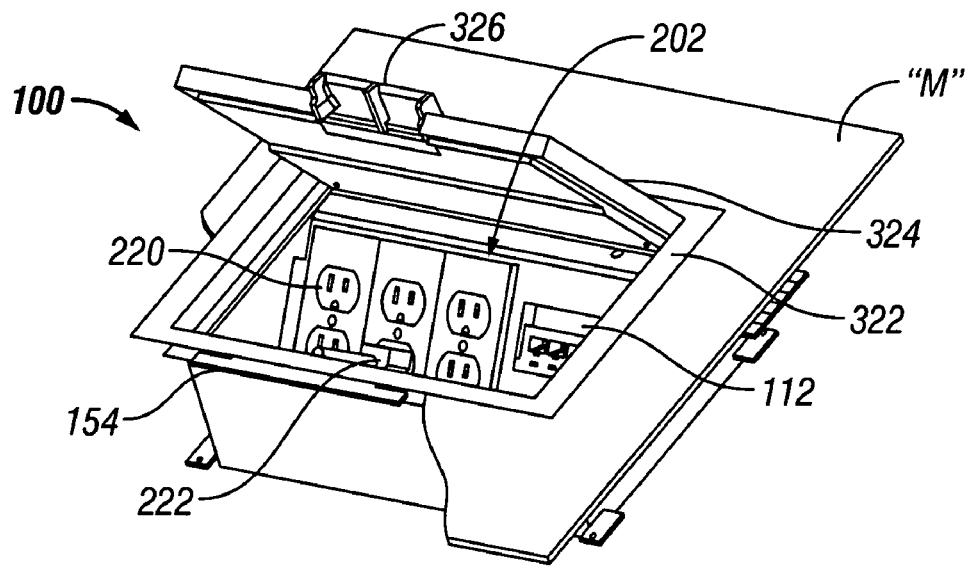
FIG. 11 is a perspective view of the universal box assembly of FIG. 1, including a trim and lid assembly operatively associated therewith, wherein the lid assembly is shown in an open condition.
Figure 12:
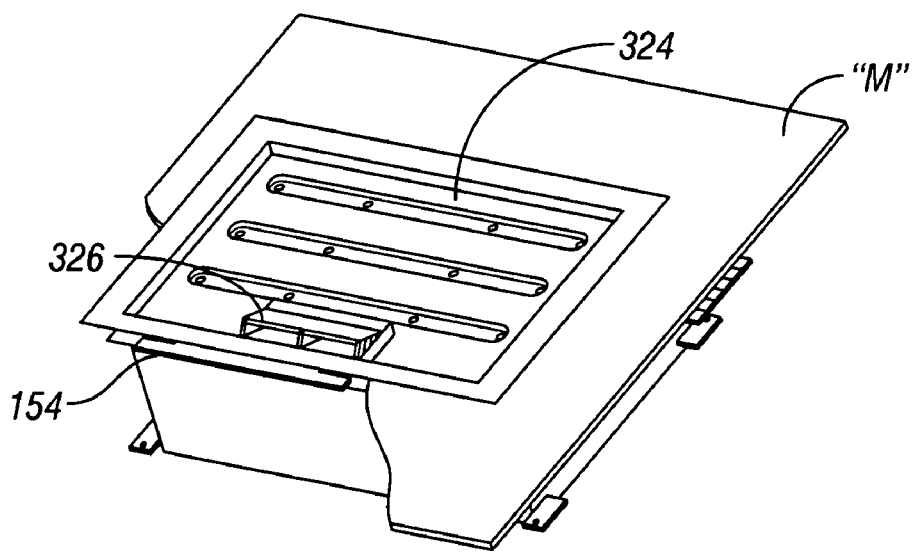
FIG. 12 is a perspective view of the universal box assembly of FIGS. 1 and 11, wherein the lid assembly is shown in a closed condition.

With reference to FIGS. 1 and 8, universal box assembly 10 may include an undercarpet power cable or routing 150 or the like operatively disposed within universal box 100. Desirably, routing 150 rests on bottom wall 102 of universal box 100 and includes a first end portion 152 which extends up rear wall 106 of universal box 100 and a second end portion 154 which extends up front wall 104 of universal box 100. In one embodiment, first end portion 152 of routing 150 extends through cut-out 106c of rear wall 106 and second end portion 154 of routing 150 extends through cut-out 104c of front wall 104. Routing 150 includes a transition block assembly 156 operative and electrically connected thereto. Transition block assembly 156 is desirably positioned within universal box 100. An exemplary transition block assembly 156 is available from AMP, Inc., a Division of Tyco Electronics Corporation, Harrisburg, Pa., and sold under the product name Undercarpet Power Cabling System Transition Block Assembly.

Transition block assembly 156 functions to convert a flat conductor type cable to a round conductor type cable. By way of example only, in accordance with the present disclosure, when a five (5) conductor (i.e., 3 phase, 4 wire "Y" connected) power undercarpet cable is brought into universal box 100 and connected to a flat cable, transition block assembly 156 enables the "line/phase" round conductors to be moved from one duplex receptacle to another duplex receptacle in order to balance the power and/or electrical loads. Accordingly, this "load balancing" is done at the interface point (i.e., at the universal floor box assembly 10), at the location between the end used or computer terminal and the power transition point, without having to go back to the panel board to rearrange conductors.

As seen in FIGS. 1 and 2, universal box 100 may further include a separator, partition or divider 160 upstanding or extending substantially orthogonally from bottom wall 102 thereof. Desirably, separator 160 extends between front wall 104 and rear wall 106. Separator 160 desirably includes an upper terminal edge 162 having a first portion 162a oriented substantially orthogonal to rear wall 106 of universal box 100, and a second portion 162b angled toward bottom wall 102 of universal box 100. Separator 160 functions to divide universal box 100 into at least a pair of spaces. Separator 160 may be positioned anywhere along the length of front wall 104 and rear wall 106. Desirably, separator 160 is offset a distance from cut-outs 104c and 106c of respective front and rear walls 104, 106.

With reference to FIGS. 1, 5, 9 and 11, a detailed description of power and activation plate assembly 200, is provided. Power and activation plate assembly 200 includes a rigid backing member or plate 202 including first mounting structure 204 for selectively connecting plate 202 to rear wall 106 of universal box 100, second mounting structure 206 for selectively connecting plate 202 to bottom wall 102 of universal box 100. For example, first mounting structure 204 may be a flange extending along substantially the entire length of plate 202 and may include through-holes 204a formed therein such that flange 204 may be secured to rear wall 106 of universal box 100 using screws (not shown) or the like. Additionally, second mounting structure 206 may also be a flange extending along substantially the entire length of plate 202 and may include through-holes 206a formed therein such that flange 206 may be secured to bottom wall 102 of universal box 100 using screws (not shown) or the like. In this manner, plate 202 is oriented at an angle within universal box 100.

Power and activation plate assembly 200 includes at least one communication/data interface 210 selectively supported on or in an appropriately sized aperture 208a of plate 202. Desirably, data interface 210 is configured and adapted for front loading and/or mounting into aperture 208a of plate 202. Data interface 210 includes at least one, preferably a plurality of ports or jacks 212 configured and dimensioned to receive a complementary plug (not shown) therein. Front loading of data interface 210 into aperture 208a of plate 202 enables data interface 210 to be pulled from (e.g., disconnected from plate 202) in order for changes to be made to the wiring behind data interface 210 and/or for service to be performed on the wiring behind data interface 210. In so doing, service and repair of the wiring behind data interface 210 is facilitated as compared to conventional in-floor floor boxes.

In one embodiment, it is envisioned that data interface 210 may snap-fit into aperture 208a of plate 202 or data interface 210 may be screwed against plate 202. It is understood that various other means of selectively connecting data interface 210 to plate 202 are known by those having skill in the art and thus the present disclosure should not be limited solely to those methods described herein.

Power and activation plate assembly 200 includes at least one electrical interface/outlet or duplex receptacle 220, here three outlets shown, selectively supported on or in an appropriately sized aperture 208b of plate 202. Desirably, duplex receptacles 220 are configured and adapted for front loading and/or mounting into aperture 208b of plate 202. Duplex receptacles 220 are configured to electrically receive a complementary plug 222 (see FIG. 5) therein. Front loading of duplex receptacles 220 into aperture 208b of plate 202 enables duplex receptacles 220 to be pulled from (e.g., disconnected from plate 202) in order for changes to be made to the wiring behind duplex receptacles 220 and/or for service to be performed on the wiring behind duplex receptacles 220. In so doing, service and repair of the wiring behind duplex receptacles 220 is facilitated as compared to conventional in-floor floor boxes.

In one embodiment, it is envisioned that duplex receptacles 220 may snap-fit into aperture 208b of plate 202 or, preferably, duplex receptacles 220 may be screwed against plate 202. It is understood that various other means of selectively connecting duplex receptacles 220 to plate 202 are known by those having skill in the art and thus the present disclosure should not be limited solely to those methods described herein. Desirably, outlet covers 224 may be provided to substantially cover duplex receptacles 220.

Turning now to FIGS. 1, 5 and 10–12, universal box assembly 10 includes a trim and lid assembly 300. Desirably, trim and lid assembly 300 is selectively attachable or mountable to universal box 100. In this manner, in accordance with the present disclosure, if trim and lid assembly 300 should become damaged, should wear out, should corrode, and/or should become old, and thus should need to be replaced or repaired, trim and lib assembly 300 may be removed from universal box 100.

As seen in FIGS. 1, 5 and 10–12, trim and lid assembly 300 includes a shroud 310 configured and dimensioned for removable placement on flanges 104b, 106b, 108b and 110b of universal box 100. Desirably, shroud 310 is placed on flanges 104b, 106b, 108b and 110b of universal box 100 following placement of universal box 100 into the floor and following placement of flooring material "M" (e.g., carpet, tile, laminate, brick, wood, etc.) onto floor and, desirably, at least partially onto flanges 104b, 106b, 108b and 110b of universal box 100.

Shroud 310 includes a perimetral flange 312, desirably having four sides as shown, dimensioned to rest atop flanges 104b, 106b, 108b and 110b of universal box 100. Shroud 310 further includes a perimetral rim 314 extending substantially orthogonally from perimetral flange 312. Desirably, perimetral rim 314 is dimensioned to extend into universal box 100 when shroud 310 is placed atop flanges 104b, 106b, 108b and 110b of universal box 100. Perimetral flange 312 and rim 314 of shroud 310 define an opening 318 for accessing the volume and/or contents of universal box 100 therethrough. Perimetral rim 314 provides strength and rigidity to perimetral flange 312.

Desirably, shroud 310 may be secured to universal box 100 by screws (not shown) or the like, extending through perimetral flange 312 thereof and into at least one of flanges 104b, 106b, 108b and 110b of universal box 100. Perimetral flange 312 defines a lip 316 configured and dimensioned to snap-fit engage a bezel 322 of a cover assembly 320.

Trim and lid assembly 300 further includes a hatch assembly 320 removably connectable to shroud 310. Hatch assembly 320 includes a bezel 322 configured and dimensioned to overlie and snap-fit engage perimetral flange 312 of shroud 310. It is envisioned and within the scope of the present disclosure that various other methods of attaching bezel 322 of hatch assembly 320 to perimetral flange 312 of shroud 310 are contemplated and encompassed by the present disclosure. Bezel 322 defines a window 323 therethrough.

Hatch assembly 320 further includes a cover or lid 324 pivotally connected to bezel 322. Preferably, cover 324 is pivotally connected to opposing sides of bezel 322. Desirably, cover 324 includes a tab or finger hold 326 to facilitate rising and lowering of cover 324. Cover 324 is movable between a closed position in which cover 324 is substantially flush with bezel 322 and thus closes window 323 of bezel 322 and universal box 100 in order to protect and/or hide the contents or components thereof, and an open position in which at least a portion of cover 324 is raised with respect to bezel 322 and thus opens window 323 of bezel 322 and universal box 100 in order to expose and enable access to the contents or components thereof.

In accordance with the present disclosure, is envisioned that universal box assembly 10 may be installed into an appropriately dimensioned hole formed in a floor, wall or the like, either post construction or pre-construction (e.g., positioned into place when concrete flooring is poured). When installing universal box assembly 10, the installer selects and punches-out appropriate knock-out plates 116a, 116b, 118 and/or 120 of universal box 100, as needed for the installation. The installer then positioned universal box 100 into, for example, the hole formed in the floor. With universal box 100 so positioned, the appropriate conduits (e.g., flat or round electrical wires/cables, flat or round data/communication cables, etc.) are fed into universal box 100 either through apertures 117a, 117b, 119 and/or 121 of universal box 100, and/or through cut-outs 104c, 106c and/or 108c of universal box 100, as described in detail above.

Universal box 100 may be leveled using leveling brackets 130, 132, as known by one having ordinary skill in the art. With universal box 100 leveled, concrete may be poured around universal box 100 (i.e., between universal box 100 and the walls of the floor defining the hole formed therein). With universal box 100 secured in the floor, shroud 310 of trim and lid assembly 300 is connected to flanges 104b, 106b, 108b and 110b of universal box 100. With shroud 310 of trim and lid assembly 300 secured to universal box 100, hatch assembly 320 of trim and lid assembly 300 is selectively connected to shroud 310, in the manner described above.

In accordance with the present disclosure, desirably, power and activation plate assembly 200 may be selectively secured to universal box 100 at any time after universal box 100 has been secured to the floor. As described above, transition block assembly 156 enables the installer and/or service technician to balance the power and/or electrical loads at the universal box location and not at the panel board. In other words, universal box assembly 10 functions as a distribution point and interconnection junction between round conductors and flat cable for power, telephone, and data cabling systems, wherein the power, telephone and data cabling systems may all be load balanced at the interface point (i.e., at the universal box) and not at the panel board.

The preferred embodiment of the invention of the present disclosure is representative of other configurations that may be employed to implement the present invention of the present disclosure. Therefore, this invention is defined by the following claims and the preferred embodiment depicted herein is merely representative of the invention.

What is claimed is:

1. A universal floor box assembly, for receiving an under-carpet power cable or routing of in-floor and/or sub-floor installation, the power cable or routing including a transition block assembly, the universal floor box assembly comprising:

a universal box including a bottom wall, front and rear walls extending upwardly from the bottom wall, right side and left side walls extending upwardly from the bottom wall, wherein the front, rear, right side and left side walls each define a respective upper terminal edge, at least one of the front, rear, right side and left side walls define an aperture formed therein, wherein at least one of an electrical, telephonic and data cable is receivable within the universal box;

a power and activation plate assembly selectively connectable to the universal box, the plate assembly including a backing member defining at least one aperture therein; and at least one of an electrical, telephonic and data interface selectively front loaded in the aperture of the backing member, wherein the at least one electrical, telephonic and data interface are selectively connectable to a transition block assembly of the power cable disposed within the universal box.

2. The universal floor box assembly according to claim 1, further comprising:
a trim and lid assembly selectively connectable with universal box, the trim and lid assembly including a shroud having a perimetral flange and a perimetral rim extending substantially orthogonally from the perimetral flange.

3. The universal floor box assembly according to claim 2, wherein the shroud is configured and dimensioned to rest atop flanges extending orthogonally outward from the front, rear, left side, and right side walls of the universal box.

4. The universal floor box assembly according to claim 3, further comprising:
a hatch assembly selectively operatively connectable to the perimetral flange of the shroud, the hatch assembly including:
a bezel configured and adapted to overlie and snap-fit engage the perimetral flange, wherein the bezel defines a window; and
a cover pivotably connected to the bezel, the cover being pivotable between a first position in which the window of the bezel is open and a second position in which the window of the bezel is closed.

5. The universal floor box assembly according to claim 4, wherein the cover defines a finger-hold to facilitate moving of the cover between the first and second positions in order to open and close the universal box.

6. The universal floor box assembly according to claim 1, further comprising a cover plate sized to rest atop the upper terminal edges of the front, rear, left side and right side walls of the universal box, the cover plate being selectively securable to the upper terminal edges of the universal box.

7. The universal floor box assembly according to claim 6, further comprising a gasket disposed between the cover plate and the upper terminal edges of the universal box when the cover plate is secured to the universal box.

8. The universal floor box assembly according to claim 7, wherein the gasket includes at least one tab extending from a surface thereof for occluding a respective cut-out formed in a respective front, rear, left side and right side wall of the universal box.

9. The universal floor box assembly according to claim 1, wherein at least one cut-out is formed in at least one of the front, rear, left side and right side walls of the universal box, wherein the cut-out extends through an upper terminal edge of the respective front, rear, left side and right side walls.

10. The universal floor box assembly according to claim 1, comprising flanges extending substantially orthogonally and outwardly from the upper terminal edges of the front, rear, left side and right side walls of the universal box.

11. The universal floor box assembly according to claim 1, further comprising knock-out plates configured and dimensioned to cover each aperture formed in each of the front, rear, left side and right side walls of the universal box.

12. The universal floor box assembly according to claim 1, wherein the universal box includes leveling brackets extending therefrom.

13. A method of load balancing electrical, telephonic and data conduits at an interface point, comprising the steps of:
providing a universal box assembly including:
a universal box configured to receive electrical, telephonic and data conduits therein;
a power and activation plate assembly selectively connectable to the universal box, the plate assembly including a backing member defining at least one aperture therein; and
at least one of an electrical, telephonic and data interface selectively front loaded in the aperture of the backing member, wherein the at least one electrical, telephonic and data interface are selectively connectable to a transition block assembly of a power cable;
disassociating at least one of the electrical, telephonic and data interfaces from the backing member; and
balancing an electrical load at the site of the universal box.

14. A universal floor box assembly, for receiving an undercarpet power cable or routing of in-floor and/or sub-floor installation, the power cable or routing including a transition block assembly, the universal floor box assembly comprising:
a universal box including a bottom wall, front and rear walls extending upwardly from the bottom wall, right side and left side walls extending upwardly from the bottom wall, wherein the front, rear, right side and left side walls each define a respective upper terminal edge, at least one of the front, rear, right side and left side walls define an aperture formed therein and a cut-out extend through a respective upper terminal edge thereof, wherein at least one of an electrical, telephonic and data cable is receivable within the universal box; and
a trim and lid assembly selectively connectable with universal box, the trim and lid assembly including:
a shroud including a perimetral flange configured and dimensioned to rest atop flanges extending orthogonally outward from the front, rear, left side, and right side walls of the universal box; and
a hatch assembly selectively operatively connectable to the perimetral flange of the shroud, the hatch assembly including a bezel configured and adapted to overlie and snap-fit engage the perimetral flange.

15. The universal floor box assembly according to claim 14, further comprising:
a power and activation plate assembly selectively connectable to the universal box, the plate assembly including a backing member defining at least one aperture therein; and
at least one of an electrical, telephonic and data interface selectively front loaded in the aperture of the backing member, wherein the at least one electrical, telephonic and data interface are selectively connectable to a transition block assembly of the power cable.

16. The universal floor box assembly according to claim 15, further comprising:
a cover plate sized to rest atop the upper terminal edges of the front, rear, left side and right side walls of the universal box; and
a gasket disposed between the cover plate and the upper terminal edges of the universal box when the cover plate is secured to the universal box, the gasket including at least one tab extending from a surface thereof for occluding a respective cut-out formed in a respective front, rear, left side and right side wall of the universal box.

17. A universal floor box assembly, for receiving an undercarpet power cable or routing of in-floor and/or sub-floor installation, the power cable or routing including a transition block assembly, the universal floor box assembly comprising:

a universal box including a bottom wall, front and rear walls extending upwardly from the bottom wall, right side and left side walls extending upwardly from the bottom wall, wherein the front, rear, right side and left side walls each define a respective upper terminal edge, at least one of the front, rear, right side and left side walls define an aperture formed therein, wherein at least one of an electrical, telephonic and data cable is receivable within the universal box;

a cover plate sized to rest atop the upper terminal edges of the front, rear, left side and right side walls of the universal box; and a gasket disposed between the cover plate and the upper terminal edges of the universal box when the cover plate is secured to the universal box, the gasket including at least one tab extending from a surface thereof for occluding a respective cut-out formed in a respective front, rear, left side and right side wall of the universal box.

18. The universal floor box assembly according to claim 17, further comprising:

a trim and lid assembly selectively connectable with universal box, the trim and lid assembly including:

a shroud including a perimetral flange configured and dimensioned to rest atop flanges extending orthogonally outward from the front, rear, left side, and right side walls of the universal box; and a hatch assembly selectively operatively connectable to the perimetral flange of the shroud, the hatch assembly including a bezel configured and adapted to overlie and snap-fit engage the perimetral flange.

19. The universal floor box assembly according to claim 17, further comprising:

a power and activation plate assembly selectively connectable to the universal box, the plate assembly including a backing member defining at least one aperture therein; and at least one of an electrical, telephonic and data interface selectively front loaded in the aperture of the backing member, wherein the at least one electrical, telephonic and data interface are selectively connectable to a transition block assembly of the power cable.

* * * * *